3,299,065
PHTHALOPERINONE COMPOUND
Chi K. Dien, Buffalo, N.Y., assignor to Allied Chemical Corporation, New York, N.Y., a corporation of New York
No Drawing. Filed Nov. 29, 1963, Ser. No. 327,078
1 Claim. (Cl. 260—251)

This invention relates to a novel compound of the phthaloperinone series, its preparation, and its use in the coloring of synthetic polymeric organic materials.

Perinone compounds have been known in the art for many years and it has heretofore been proposed to use them, and specially 12-phthaloperinone, as colorants for synthetic plastic materials. However, many of said compounds, which are relatively expensive, are lacking in tinctorial strength; so that their use is limited by cost considerations. Further, the solubility of many of said compounds in synthetic resin monomers is limited; so that their use in the coloration of resins by polymerization of the colored monomer is not feasible, save in light shades.

It is a principal object of this invention to provide a novel 12-phthaloperinone having high tinctorial power, high fastness to light, stability to heat, and substantial solubility in synthetic resin monomers.

A further object of this invention is to provide a new coloring agent for synthetic resins and other synthetic plastics which colors them in bright reddish-yellow shades having high tinctorial strength and excellent fastness to light and to heat.

Other objects and advantages ancillary thereto will be obvious from the following specification.

I have discovered that 8,9,10,11-tetrahydro-12-phthaloperinone, which has the formula

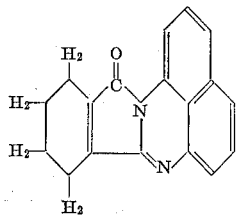

is a compound having unusual tinctorial properties combined with fastness and solubility properties which render it of special value as a coloring agent for various synthetic polymeric organic materials.

Thus, I have discovered that 8,9,10,11-tetrahydro-12-phthaloperinone is an unexpectedly superior colorant or pigment for synthetic resins, particularly synthetic thermoplastic resins (including such polymeric materials as polystyrene, polymethylmethacrylate, polyvinyl chloride and vinylidene chloride polymers and copolymers, polyethylene, polypropylene, fluorohydrocarbon polymers, silicones, and cellulosic esters and ethers), more particularly those which are obtained by polymerization of an unsaturated organic monomer, and especially those which in the normal form are clear, substantially water-white, glass-like solids. I have discovered that 8,9,10,11-tetrahydro-12-phthaloperinone colors such resins in strong, desirable bright reddish-yellow shades which have excellent fastness to light and to weathering, which are stable to processing or forming operations at high temperatures (e.g. up to 700° F.), such as molding, spinning, extrusion and the like, and which are stable in the presence of additives such as peroxides. It does not change color when mixed with the thermoplastic resins, or with the monomers from which they are obtainable, and the mixtures are processed under said usual elevated temperature and pressure conditions. Moreover, this unique colorant does not exhibit any anti-catalytic effect when used with monomeric substances, e.g. styrene and methylmethacrylate, and is not itself adversely affected by the catalysts used in the polymerization.

An outstanding unexpected and advantageous property of the tetrahydrophthaloperinone of the present invention is its solubility in said resins, especially in synthetic resin monomers, e.g. methylmethacrylate and styrene, and in many of the common organic solvents used in commercial manufacture, e.g., toluene and ethyl acetate. Thus, the novel tetrahydro-12-phthaloperinone of the present invention has a solubility in monomethylmethacrylate six times that of 12-phthaloperinone. As a result, resins which in the normal form are clear, glass-like solids, and especially polystyrene and polymethylmethacrylate, form clear, reddish-yellow glass-like products of high tinctorial strength which color is not altered by the heat treatments involved in their formation or on exposure to sunlight or on weathering, and which products retain their gloss and clarity; for example, amber lenses for automobile turn-signal lights. Moreover, its solubility in lower alcohols is low, so that bleeding is reduced upon contact with said solvents.

I have further discovered that 8,9,10,11-tetrahydro-12-phthaloperinone can be obtained by condensing $\Delta^1$-tetrahydrophthalic anhydride (1-cyclohexene-1,2-dicarboxylic anhydride) with 1,8-diaminonaphthalene. The condensation takes place over a wide range of temperatures (i.e. from about 50° C. to 250° C. or higher) and can be carried out in presence or absence of water or an organic solvent (such as, acetic acid, mono-, di-, or trichlorobenzene, nitrobenzene, diphenyl, or the like) and at atmospheric pressure or at superatmospheric pressure in a closed vessel. The product is preferably used in a finely divided state, which can be obtained in known manner; as by micropulverizing, salt grinding, and the like.

The preparation of the colored synthetic polymeric plastic materials of my invention can be accomplished by known means. For example pellets, rods or beads (the usually available commercial forms) of the polymer to be colored can be surface coated with the tetrahydrophthaloperinone by mixing the polymer and said colorant in a suitable mixer, and the thus coated polymer can be fed to a suitable molding press, extruder or melt spinner. Alternatively, an aqueous paste or solvent solution of the colorant can be admixed with the comminuted polymer, the mixture dried and the dried mix, after additional mixing if desired (for example in a ribbon mixer), can be fed to a suitable molding press, etc. The colorant also can be dissolved or suspended in the resin monomer, and the resulting solution or suspension can be polymerized (in the conventional manner) and formed, in one or separate operations.

Thus, in producing colored synthetic thermoplastic resins, 8,9,10,11-tetrahydro-12-phthaloperinone in finely divided state is mixed with granular polystyrene or polymethacrylate; the mixture is tumbled to surface coat the resin with the colorant and is then fed to a suitable molding or extrusion apparatus operating at a suitable temperature between about 300° and about 700° F. Temperatures between about 300° and about 400° F. are preferably employed for polymethylmethacrylate, and between about 400° and about 600° F. are preferably employed for polystyrene. The resulting colored products are clear, bright reddish-yellow colored articles which show no evidence of shade alteration and which are exceptionally fast to light. Or, in accordance with another of said procedures, the tetrahydrophthaloperinone is dissolved in the monomer form of the desired thermoplastic resin (e.g., monomethylmethacrylate or styrene) containing a suitable polymerization catalyst, and the solution is heated to induce polymerization in the usual manner (preferably to between about 100° and about 250° F. for monomethylmethacrylate and between about 120° F. and about 300° F. for styrene). The resultant polymer can be formed in any suitable manner (e.g., extruded, molded, spun, and the like), as by molding or extrusion in the above manner. The formed articles thus obtained have properties substantially identical with those formed by coloring the polymer itself.

The amount of 8,9,10,11-tetrahydro-12-phthaloperinone used to color the synthetic polymeric organic material can be varied over a wide range. The particular amount used is dependent upon the depth of shade or coloration desired. This aspect of the invention contemplates the addition of colorant in the range from extremely minute amounts to extremely large amounts which are limited only by the compatibility of the tetrahydrophthaloperinone and the particular resin being colored and which may vary to a considerably degree from resin to resin, as will be evident to those skilled in this art.

Thus, for light tints (for example, for pastel shades in finished pieces) amounts as low as 0.0001 part per 100 parts by weight of the resin or resin composition are sufficient; whereas, for deep shades or for master batches and the like, amounts of the order of 5.0 parts or more can be used (per 100 parts by weight of resin composition). Master batches can be prepared, for example, by mixing the colorant, in an amount of say about 0.5% to about 5.0%, with the synthetic resin composition, feeding the mixture to a conventional extruder, molding press or melt spinner, then comminuting (e.g., pelleting) the colored resin. (Percentages are by weight of resin mixture.) Products of any desired lighter shade then can be obtained by mixing the colored master batch with a suitable amount of the unpigmented resin and further processing the mixture, e.g., feeding said mixture to any suitable forming means, such as, an extruder, molding press, fiber spinner, or the like.

The 8,9,10,11-tetrahydro-12-phthaloperinone of the present invention also can be used to dye synthetic fibers, e.g., aromatic polyesters of the polyalkylene glycol terephthalate type ("Dacron," "Kodel," "Terylene") in the manner of "disperse" dyes, by contacting the polyester fiber with an aqueous dispersion of the tetrahydropthhaloperinone in finely divided form at the boil, preferably in the presence of a carrier (e.g., phenylphenol), or at more elevated temperatures (e.g., 110° to 130° C.) under pressure. The polyester fibers thus are dyed orange shades which are fast to light, sublimation, washing and gas fumes.

The invention will be illustrated by the following specific examples in which parts are by weight. The invention is not to be limited to the details set out therein, since variations can be made without departing from the scope or spirit of the invention.

*Example 1*

A mixture of 15.8 parts of 1,8-diaminonaphthalene, 15.5 parts of 1 - cyclohexene-1,2-dicarboxylic anhydride (Δ'-tetrahydrophthalic anhydride) and about 150 parts of o-dichlorobenzene was heated to and maintained boiling (170° to 180° C.) under reflux conditions for about 6 hours. The resulting reddish-orange solution was cooled to about 25° C. while being allowed to stand for about 16 hours, and the slurry of reddish-orange crystals which formed was separated by filtration. The filter cake was washed with about 80 parts of ethanol and then with water until the filtrate was free of color. The resulting product, 8,9,10,11-tetrahydro-12-phthaloperinone melted at 206° to 209° C. (uncorr.) and did not decompose on being heated to 310° C. When tested for tinctorial strength by measuring the transmittance of a solution of 10 parts in a million parts of xylene with a General Electric recording spectrophotometer, using a 10 mm. cell, its transmittance was 64% at 468 millimicrons.

*Example 2*

Part A.—A mixture of 100 parts of polystyrene pellets and 0.05 part of 8,9,10,11-tetrahydro-12-phthaloperinone was placed in a covered metal container. This was tumbled mechanically for 5 minutes. Thereafter the coated resin was fed to a laboratory extruder, the die of which was heated to 600° F. (Zone 1 maintained at 375° F. and Zone 2 at 550° F.) and the resin was extruded at slow speed in the form of a continuous rod ⅛" in diameter. The rods so obtained were colored a clear bright orange. They showed no alteration in shade from the original color. (In contrast thereto, rods which were prepared in the same manner, but using 12-phthaloperinone as the pigment, had only about 50% of the color strength.)

Part B.—The rods were pelletized and then formed, in an injection molding press at about 400° F., into plaques approximately 2" x 3" x ¼". When these plaques were exposed for 320 hours in the Fade-Ometer, there was no alteration in shade.

*Example 3*

Part A.—A mixture of 100 parts of monomethylmethacrylate, 0.1 part of benzoylperoxide and 0.25 part of 8,9,10,11-tetrahydro-12-phthaloperinone was heated on a steam bath until vigorous boiling occurred. The mixture was removed from the bath, and after the initial vigorous reaction had subsided, it was placed in a warm (140° F.) oven for about 16 hours. Thereafter the polymerization was completed by heating the mass on the steam bath for 1 hour. The polymer was extruded, pelletized and molded into a plaque as described in Example 2 above. The clear bright orange color polymer was exposed in the Fade-Ometer for 320 hours without alteration in shade.

Part B.—Instead of the tetrahydrophthaloperinone employed in Part A, 0.25 part of 12-phthaloperinone was used to pigment the monomethylmethacrylate in the same manner. The resulting plaque was considerably lighter in shade and contained specks of pigment distributed through it.

Since changes in the preparation of the novel 8,9,10,11-tetrahydro-12-phthaloperinone and the colored polymeric compositions disclosed herein can be made without departing from the scope or spirit of my invention, it is intended that all matter contained in the above description shall be interpreted as illustrative and not in a limiting sense, except as limited by the claim.

I claim:

8,9,10,11-tetrahydro-12-phthaloperinone.

References Cited by the Examiner

UNITED STATES PATENTS

| | | | |
|---|---|---|---|
| 2,338,741 | 1/1944 | Soday | 260—41.5 |
| 2,668,804 | 2/1954 | Lantz et al. | 260—41 |
| 2,761,789 | 9/1956 | Locher et al. | 106—193 |
| 2,801,225 | 7/1957 | Harding | 260—41 |
| 2,851,371 | 9/1958 | Stephens | 106—193 |
| 2,889,327 | 6/1959 | Howard et al. | 260—251 |
| 2,891,061 | 6/1959 | Delarve | 260—251 |

FOREIGN PATENTS

| | | |
|---|---|---|
| 1,075,110 | 10/1954 | France. |
| 566,294 | 8/1957 | Italy. |
| 335,796 | 3/1959 | Switzerland. |

NICHOLAS S. RIZZO, *Primary Examiner.*

MORRIS LIEBMAN, *Examiner.*

A. LIEBERMAN, *Assistant Examiner.*